US008627232B2

(12) United States Patent
Stiso et al.

(10) Patent No.: US 8,627,232 B2
(45) Date of Patent: Jan. 7, 2014

(54) GRAPHICAL TOOL FOR DEFINING A SET OF RANGES

(75) Inventors: Michael Stiso, San Francisco, CA (US); Alan B. Ashby, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1509 days.

(21) Appl. No.: 11/603,778

(22) Filed: Nov. 22, 2006

(65) Prior Publication Data

US 2008/0120565 A1  May 22, 2008

(51) Int. Cl.
 *G06F 3/048* (2013.01)
(52) U.S. Cl.
 USPC .......................................... 715/833; 715/764
(58) Field of Classification Search
 USPC .......... 715/241, 712, 721, 783, 855, 764, 833
 See application file for complete search history.

(56) References Cited

U.S. PATENT DOCUMENTS

| | | | | |
|---|---|---|---|---|
| 5,265,246 A * | 11/1993 | Li et al. | | 707/4 |
| 5,592,663 A * | 1/1997 | Nagamori | | 707/5 |
| 5,608,899 A * | 3/1997 | Li et al. | | 707/4 |
| 5,721,900 A * | 2/1998 | Banning et al. | | 707/4 |
| 6,208,985 B1 * | 3/2001 | Krehel | | 707/3 |
| 6,326,962 B1 * | 12/2001 | Szabo | | 715/762 |
| 7,634,730 B2 * | 12/2009 | Weber et al. | | 715/705 |
| 7,873,917 B2 * | 1/2011 | Larsen et al. | | 715/833 |
| 2008/0040161 A1 * | 2/2008 | Faux et al. | | 705/3 |

* cited by examiner

*Primary Examiner* — Steven Sax
*Assistant Examiner* — Christopher J Fibbi
(74) *Attorney, Agent, or Firm* — Kilpatrick Townsend & Stockton LLP

(57) ABSTRACT

This disclosure describes, generally, tools to allow more intuitive display and/or definition of ranges in software applications. Merely by way of example, a software application might include a user interface that has a graphical element (such as a line, a bar, and/or the like) that represents a spectrum of values. The application might further include one or more markers that serve to define boundaries of one or more ranges within the spectrum. By allowing a user to move the markers (through manipulation of the markers using a mouse, typing values for the markers, and/or the like), the interface can allow the user to quickly and easily define different ranges of values and/or to view defined ranges. In an aspect, a marker (and/or an accompanying indicator) may be configured to indicate to the user whether the value represented by the marker falls within or outside the range bounded by the marker.

12 Claims, 7 Drawing Sheets

GRAPHICAL TOOL FOR DEFINING A SET OF RANGES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to computer software, and more particularly to graphical tools for allowing a user to input information.

BACKGROUND OF THE INVENTION

Many software applications require, as input, one or more ranges of numbers. Merely by way of example, in a business application (such as an electronic commerce application, a financial application, enterprise resource planning ("ERP") application, customer relationship management ("CRM") application, supply chain management application, and/or the like), a set of business rules might be used to perform actions on business records according to the characteristics of the records. Different rules, then, might apply to different records, depending on the values of various data elements in those records. In particular, one business rule might apply to a set of records having a data element with a value that falls within a first range, while a different business rule might apply to records having data element with a value that falls within a second range.

Hence, in business software (as well as other software), the application of various rules or operations to data often requires the user to define a variable whose values consist of a set of ranges (upon which the rule or operation is dependent). For example, if a wine merchant developed a set of rules to automatically apply discounts to online purchases, one of the many variables that might be in that ruleset could depend on the quantity of the purchase, or number of bottles ordered. The values for QUANTITY, then, and the corresponding discounts, might include the following: a QUANTITY greater than 0 and less than 8 has no discount, a QUANTITY greater than or equal to 8 and less than 12 has a 2% discount, a QUANTITY equal to 12 has a 5% discount, a QUANTITY greater than 12 and less than 24 has an 8% discount and a QUANTITY greater than or equal to 24 has a 10% discount.

An important feature of the set of ranges in the example above is that it is continuous: It accounts for all nonzero values. Range continuity for a given variable is critical in the area of business rules because it enables the ruleset to respond to any occurrence of that variable. Without continuity, if the ruleset encounters values that are not defined in the variable's set of ranges, then an error will occur, thus breaking the ruleset. Consider, for example, a case in which, instead of the rules above, the wine merchant's e-commerce application had the following rules: a QUANTITY greater than 0 and less than 8 has no discount, a QUANTITY greater than 10 and less than 12 has a 2% discount, a QUANTITY equal to 12 has a 5% discount, a QUANTITY greater than 12 and less than 24 has an 8% discount, and a QUANTITY greater than or equal to 24 has a 10% discount. This set of ranges leaves a gap between 8 and 10, breaking the continuity of the ruleset; as a result, if a customer orders, say, 9 bottles of wine, the system will not know how to respond.

Translating the ranges for a variable into something that can be read by computers generally requires a user to enter the relevant values into the computer using mathematical comparison symbols (or other comparison operators). The following are examples of methods that individuals might use to rewrite the ranges defining QUANTITY for the first example above:

$0<QUANTITY<8$
$8<=QUANTITY<12$
$QUANTITY=12$
$12<QUANTITY<24$
$24<=QUANTITY$
$0<x<8$
$8<=x<12$
$x=12$
$12<x<24$
$24<=x$
$(0,8)$
$[8,12)$
$12$
$(12,24)$
otherwise Unfortunately, using such text-based methods to translate natural-language rules into a machine-readable format raises a host of problems. Merely by way of example, the system in question must either constrain users to one particular textual format for entering ranges or be able to handle many different formats. The former option places strain on the users if they have to adapt to an unfamiliar method, as well as on the user interface if it has to instruct users on what method to use; the latter option places strain on the developers and the system.

Moreover, such text-based lists are difficult to scan quickly, making it difficult to detect errors such as gaps. For this reason and others, text-based methods of defining a set of ranges are prone to errors. Among other problems, users may make typographical errors, in which they accidentally enter a number or comparison symbol incorrectly; errors of comprehension or reading, in which they either misunderstand or misread the comparison symbols (e.g., confusing the < symbol for the > symbol); and/or errors of omission, in which individuals forget to include one or more values in the set of ranges, leading to a broken set, such as when, for example, a user forgets to include an include an endpoint value in defining adjacent ranges.

For these reasons, among others, there is a need for a more intuitive facility to allow a user to define ranges of values (and/or to view such definitions) within the context of a software application.

BRIEF SUMMARY OF THE INVENTION

Embodiments of the invention, therefore, provide tools to allow more intuitive display and/or definition of ranges in software applications. In a set of embodiments, for example, a software application might include a user interface that has a graphical element (such as a line, a bar, and/or the like) that represents a spectrum of values. The application might further include one or more markers that serve to define boundaries of one or more ranges within the spectrum. By allowing a user to move the markers (through manipulation of the markers using a mouse, typing values for the markers, and/or the like), the interface can allow the user to quickly and easily define different ranges of values and/or to view defined ranges. In an aspect of some embodiments, a marker (and/or an accompanying indicator) may be configured to indicate to the user whether the value represented by the marker falls within or outside the range bounded by the marker.

Various sets of embodiments provide user interfaces, methods, systems, and software products. Certain methods of the invention might implement user interfaces of the invention, might be implemented as software programs and/or might be implemented as instructions to be performed by a computer system. Similarly, systems of the invention can include computers configured with software (e.g., sets of instructions) executable to perform methods of the invention and/or to implement user interfaces of the invention.

An exemplary set of embodiments, for example, provides a computer software application comprising a user interface for allowing a user to define one or more ranges of values (which might be continuous ranges). The user interface, in some embodiments, comprises a graphical element (e.g., a slider, a number line, and/or the like) representing a spectrum of values and/or a plurality of markers. Merely by way of example, the interface might include a first marker representing a beginning of a first range of values within the spectrum of values and/or a second marker representing an end of the first range of values. Hence, the first marker and the second marker might define the first range of values.

In some embodiments, the user interface is configured to allow a user to provide a set of inputs to define a range of values. The inputs might comprise a first input to set a position of the first marker, thereby setting a first value representing the beginning of the First range of values, and/or a second input to set a position of the second marker, thereby setting a second value representing the end of the first range of values. Any of a variety of inputs might be supported, including without limitation, inputs from a pointing device, inputs from a keyboard device, and/or the like. In some cases, the user interface might allow a user to manipulate a marker with a mouse cursor (using, for example, a click-and-drag operation to set a position of a marker). In other cases, the user interface might provide a text input field, which can be used, for example, to type in a text entry for a value for a marker.

In specific embodiments, the set of inputs might include further inputs to allow a user to specify a behavior of a marker (e.g., to specify whether the marker is part of an adjacent range of values) and/or to add a marker, delete a marker, and/or the like.

Based on the positions of the first and/or second markers, the interface might be configured to provide, as input to the software application, the first range of values, as defined by the position of the first marker and the position of the second marker.

An exemplary method of graphically presenting information to a user, in accordance with another set of embodiments, might comprise displaying on a display device a graphical element representing a spectrum of values, displaying on the display device a first marker representing a beginning of a range of values within the spectrum of values, and/or displaying on the display device a second marker representing an end of the range of values. Such that the first marker and the second marker define the range of values. The method, in some embodiments, includes receiving, (e.g., from a user), a first input and setting a position of the first marker, based on the first input (thereby setting a first value representing the beginning of the range of values), and/or receiving a second input and setting a position of the second marker, based on the second input (thereby setting a second value representing the end of the range of values). Optionally, the method might include providing, as input to a software application, the range of values, as defined by the positions of the first and second markers. In some cases, the displayed position of a marker might be adjusted in response to receiving an input that sets a position of the marker.

In certain embodiments, the method might further comprise providing one or more interface elements (such as combo boxes, check boxes, text fields, etc., to name but a few examples) for the user to define one or more business rules that apply to one or more ranges of values. Alternatively and/or additionally, additional markers might be displayed. These additional markers might represent the beginning and/or end of additional ranges of values, and additional interface elements can be provided to define business rules that apply to these additional ranges.

In some cases, the method might comprise receiving additional input (e.g., displaying a menu for the user and/or receiving a selection from the menu) to indicate whether the value represented by a marker should be considered part of a range defined by the marker. Merely by way of example, if a particular marker represents the end of a first range of values and the beginning of a second range of values, the additional input might indicate that the marker should be considered part of the first range, part of the second range, or neither. In such cases, the method might further comprise modifying a display of the marker, based on this additional input.

Another set of embodiments provides systems. An exemplary system, as noted above, might comprise a processor, a display device, and a computer readable medium comprising a set of instructions executable by the processor. The set of instructions might comprise instructions to perform methods of the invention. Similarly, a computer program embodied on a computer readable medium, might comprise a set of instructions executable by one or more computer to perform methods of the invention.

Another exemplary computer system might comprise a database having a plurality of records, each of which might comprise a data element that corresponds to a field in the database, and/or a software application. The software application might comprise a set of instructions executable by the computer system.

The set of instructions might comprise, inter alia, instructions to display a user interface. The user interface, in a set of embodiments, comprises a graphical element representing a spectrum of values for a first field in the database and a first marker representing a beginning of a first range of values within the spectrum. The user interface might comprise a second marker representing an end of the first range of values and a beginning of a second range of values within the spectrum, and/or a third marker representing an end of the second range of values.

In some embodiments, the set of instructions further comprises instructions to receive from the user a set of inputs and/or instructions to set, perhaps based on the set of inputs, a position of the first marker, a position of the second marker, and a position of the third marker. The positions of the first and second markers might define a first set of boundaries of the first range of values, and/or the positions of the second and third markers might define a second set of boundaries of the second range of values.

There might be further instructions to sort the plurality of records into a plurality of sets of records. Merely by way of example, the plurality of sets of records might comprise a first set of records and a second set of records. The first set of records might comprise one or more records each comprising a data element having a value falling within the first set of boundaries, and the second set of records might comprise one or more records each comprising a data element having a value falling within the second set of boundaries. There set of instructions, then, might include instructions to apply a first business rule to each record in the first set of records and/or instructions to apply a second business rule to each record in the second set of records.

Hence, embodiments of the invention overcome a variety of shortcomings of previous solutions, including without limitation those described above, as well as others that will become apparent to one of skill in the art upon review of this disclosure.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components. It should be noted that the drawings, and accompanying description, are intended to illustrate a few exemplary embodiments but are not intended to be comprehensive or limiting.

DETAILED DESCRIPTION

Figure 1A:
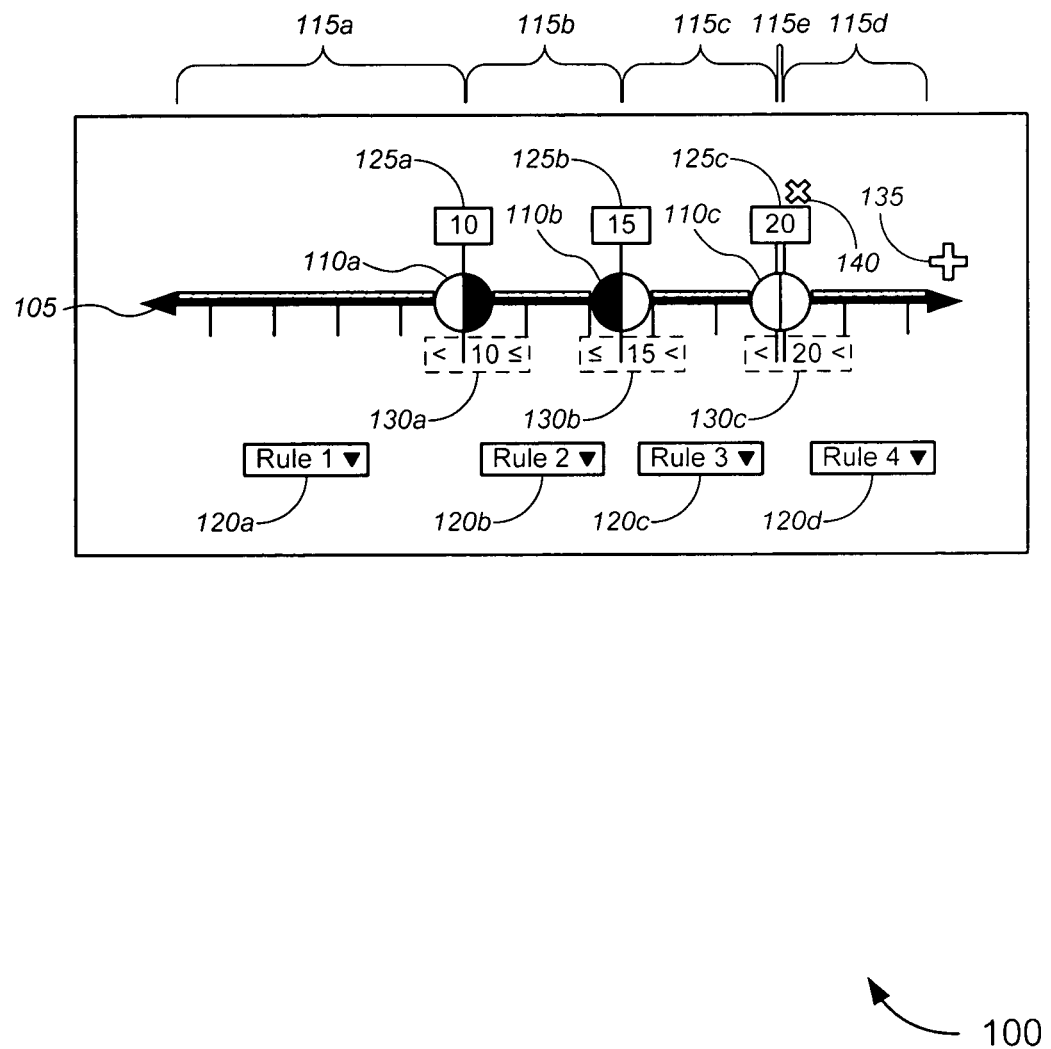
FIGS. 1A, 1B, and 2 depict user interfaces for displaying and/or defining ranges of values, in accordance with various embodiments of the invention.

Various embodiments of the invention provide a graphical tool for users to create and view a set of ranges. In an aspect, certain embodiments comprise a number line onto which users can add multiple markers, which represent boundaries of the ranges. As with a slider GUI widget, users can slide those markers to particular values. In an embodiment, however, the given value for a marker represents the end of one range and the beginning of another. Hence, multiple markers can function to partition the number line into a set of ranges.

Advantageously, because humans have a sophisticated visual system, graphically portraying a set of ranges can capitalize on that system to facilitate the user's ability to scan and understand the set. In an aspect, the graphical interface of some embodiments presents the range information in a visual form that likely more accurately reflects the user's mental representation of a range; moreover, in some (but not necessarily all) embodiments, it does so by mimicking a number line, which is a familiar construct to most people.

Generally, using a single number line to represent a continuous set of ranges whose endpoints must be in one and only one range has been difficult. The problem is that few simple visual methods currently exist to indicate whether a given endpoint value is included in the range to the left or to the right, or to let users easily set the range in which the value is included. In other words, looking at the number line, there would be no indication as to which range a particular range boundary value belongs. Indicating a single point among a group of ranges is even more difficult, and perhaps because of those challenges, graphical means of defining ranges seem not to have been explored much—despite the usefulness of graphics in this area.

In an aspect, one set of embodiments overcomes those challenges by using partially filled markers (which might be circles and/or any other appropriate graphical indicators) to mark the endpoints of defined ranges on the number line. Merely by way of example, in one embodiment, only the left or right side of a given marker is filled; the location of the filled hemisphere indicates whether the value of the marker's position on the number line is included in the range to the left or to the right. (In another aspect, to indicate a single point which is not a member of either adjacent range, neither half of the marker is filled, but a vertical line might run through the center of the marker.) As a result, the markers provide a method of conveying range information that is easily scannable and understandable by users. It should be noted that any of a variety of shapes or indicators could be used for markers, advantageously, however, many embodiments incorporate some sort of intuitive signaling method into the marker to indicate in which range the given value belongs.

Moreover, by employing a graphical representation (as opposed, for example, to a purely textual representation), some embodiments of the invention alleviate many problems endemic to existing systems, including (merely by way of example, the following: Neither the system nor the user needs to accommodate different formats for entering ranges. Because the user does not use text to describe the ranges, no formatting is necessary: The user instead positions markers along a graphical element representing a spectrum of values (such as a number line, to name but one example), which is representation familiar to most users. Further, rather than having to read a text-based list in a two-dimensional pattern, the graphical interface of many embodiments lets users scan the set of ranges along a single dimension (left to right), allowing at-a-glance comprehension.

Other embodiments can also eliminate many of the errors that can occur with traditional methods of range entry, such a typographical errors (which can be prevented, for example, by allowing users to manipulate markers with a mouse or other pointing device, eliminating the need for text input altogether). Similarly, errors of comprehension or reading, which can be mitigated or eliminated by a clear visual signaling mechanism, which decreases the likelihood that the user will select or type in the incorrect comparison symbol to indicate which (if either) adjacent range an endpoint should be considered a part of—also, the potential ambiguity or misuse of typical comparison symbols can be minimized by using graphical shapes.

Further, errors of omission, which manifest themselves as "gaps" in the set of ranges in the spectrum, can be mitigated or eliminated in some embodiments, because in such embodiments, every marker on the slider represents the end of one range and the beginning of another: Users can slide a given fob to any value, and by default that value may be set to be included in one of the adjacent ranges (i.e., a range to the left of the marker, or a range to the right of the marker). Users might be given the option to modify the behavior of the marker, such that the value is included in the range that is not the default, or they can assign the marker to a single point (in effect, a range of 1), such that it is included in neither of the adjacent ranges. However, in such embodiments, users have no way to create a gap in the number line by (accidentally or otherwise) leaving a value undefined. Hence, in an aspect, these embodiments provide a tool to define a continuous set of ranges (i.e., a set of ranges that has no discontinuities or gaps between them). It should be noted, however, that other embodiments of the invention may allow users to define ranges that are not continuous (i.e., where there are gaps or discontinuities between the ranges). Optionally, these gaps can be considered ranges unto themselves.

To illustrate some of these advantages of various embodiments, FIG. 1A depicts an exemplary user interface 100 in accordance with a set of embodiments, which can be used to display for a user a set of ranges and/or to allow a user to define one or more ranges within a spectrum of values. (For ease of description, the user interface 100, and/or components thereof, sometimes is referred to herein as a "slider.").

In some cases, the interface 100 comprises a graphical element 105, which represents a spectrum of values. (In the illustrated example, the graphical element 105 comprises a number line, although other types of graphical elements, including circles (e.g., pie graphs), exponential curves, and/or the like might be used to illustrate a spectrum of values.)

As used herein, the term "spectrum" means any array of values, which may be continuous or discrete (i.e., divided into whole numbers, etc.). The values may be numeric, alphabetic and/or the like, and they may (but need not) be associated with units of measurement (of money, time, wavelength, frequency, etc.). A spectrum may be bounded (at either the upper and/or lower end), infinite (at either the upper and/or lower end) and/or mixed (i.e., bounded at one end and infinite at the other end). Merely by way of example, a spectrum in some embodiments might have a lower bound of zero and might have no upper bound. In some embodiments, a user might be given the option to set (or unset) the boundaries at each end of the spectrum. In other embodiments, the user might be given the option to set a scale of the graphical element 105 with respect to the spectrum. The graphical element 105 may or may not have labels, tick marks and/or the like (as illustrated, the graphical element 105 has tick marks but no labels).

The user interface 100 might also have a plurality of markers 110, which, in an embodiment of the invention, serve to define boundaries for ranges within the spectrum of values. Merely by way of example, in the interface 105, a first marker 110a defines a first range 115a (which, in this case, is unbounded at the lower end, but might also be bounded by the boundary of the spectrum represented by the graphical element 105 and/or by another marker) of values within the spectrum represented by the graphical element 105, while the first marker 110a and second marker 110b define a second range 115b, the second marker 110b and a third marker 110c define a third range 115c, and the third marker 110c also defines a fourth range 115d (which, in this case, is unbounded at the upper end, but might also be bounded by an upper boundary of the spectrum and/or by another marker). It should be noted as well that the third marker 110c also defines a fifth range 115e, which is merely the value of the marker 110c itself. (In other words, the marker 110c is configured not to be a member of either of the adjacent ranges 115c or 115d, but instead is a range 115e unto itself.) In the illustrated embodiment, the markers comprise graphical circles, but, as noted above, any other suitable indicia might be used as markers in various embodiments of the invention.

In a set of embodiments, the interface 100 also provides one or more interface elements that allow the user to define business rules (or other operations) that should be applied to the various ranges 115 defined by the markers 110. Merely by way of example, in the illustrated embodiment, the interface 105 provides a plurality of "combo boxes" 120 known in the art, which allow the user identify business rules to apply to each defined range 115. For example, a first combo box 120a allows a user to select a business rule to apply to the first range 115a of values, a second combo box 120b allows a user to select a business rule to apply to the second range 115b of values, and so forth. There also might be an interface element corresponding to range 115e, although that element, for purposes of clarity, is not displayed on FIG. 1A. (It should be noted that, while the interface 105 illustrated by FIG. 1 provides combo boxes for this purpose, a variety of other interface elements, including merely by way of example, radio buttons, check boxes, text entry fields, lists, and the like may be used in addition, or as an alternative, to such combo boxes. One skilled in the art will appreciate, based on the disclosure herein, that there are a variety of interface elements available for this purpose, and any of such elements may be used in accordance with various embodiments of the invention.)

As used herein, the term "business rule" means any statement that defines or constrains a computer program's operation or an aspect of the business that the computer program is designed to model, simulate and/or analyze. A typical example of a business rule in the e-commerce context is the application of a discount to a purchase. Within the context of the present invention, for example, a set of business rules might comprise a rule that provides that a first discount applies to a purchase of a quantity within a first range, and another rule that provides that a second discount amount applies to a purchase of a quantity within a second range. Another example might be a business rule that applies SQL "SELECT" statements to records in a database, based on the value of a data element in each record. Hence, for example, an application might select for one type of report all records with a sale amount within a first range, and select for another type of report all records with a sale amount within a second range. One skilled in the art will appreciate, based on the disclosure herein, that there are a wide variety of business rules that might be implemented based on ranges defined by the user interface 100 of FIG. 1A.

In an aspect, the markers 110 can be positioned by the user. In some embodiments, the markers are configured to be manipulated, for example, by selecting (i.e., clicking and holding) a marker 110a with a mouse and dragging the marker 110a to the desired position on the slider 105. In other embodiments, the markers 110 are configured to be positioned based on textual input from a user (such as a user typing a value into a field 125 corresponding to each marker 110). In such embodiments, a marker 110 may be configured to reposition itself after a valid value has been input into the corresponding field 125. Still further embodiments might support both manipulation/positioning with a pointing device and positioning through textual input.

In some embodiments, the interface 100 may also include textual indicators (such as the indicators 130 highlight by broken lines on FIG. 1A) to indicate a value corresponding to a current position and/or behavior of the marker. In other embodiments, however, these textual indicators 130 may be omitted. For example, in cases in which a text-entry field 125 is provided, the text entry field 125 may also serve as an indicator (which, for example, might be updated with a new value corresponding to a marker's new position after manipulation with a pointing device, thereby also serving as both a means for positioning the marker and an indicator of the marker's position). The indicators 130, then, might be unnecessary and could be omitted (or included) as desired.

In some cases (for example, as illustrated by FIG. 1A), an indicator 130 may include a textual and/or graphical indication of the behavior of the corresponding marker 110. Such as a < symbol or a ≤ symbol on either side of a numeric representation of the marker's value, indicating which, if either, adjacent range the marker belongs to. Merely by way of example, the first indicator 130a includes a < symbol to the left of the value of the corresponding marker 110a (which is 10, in the illustrated example), and a ≤ symbol to the right of the value, indicating that the marker is part of the range 115b to the right of the marker 110 (Such that the range 115b includes values from 10 to 15, and the range 115a includes values up to, but not including 10.

In other cases, the markers 130 themselves might be configured to provide a graphical indication of the markers' respective behavior. Merely by way of example, in the interface 100 illustrated by FIG. 1A, half of each marker is shaded to indicate which (if either) adjacent range the marker is a member of. So, for example, the right half of the first marker 110a is dark, indicating that the marker 110a is a member of the range 115b, not range 115a. Similarly, the left half of the second marker 110b is dark, indicating that the marker 110b is also a member of the range 115b. In some cases, such as marker 110c, neither half of the marker is shaded, indicating that the marker is a member of neither adjacent range 115c or 115d, but instead is a range 115e unto itself.

Figure 1B:
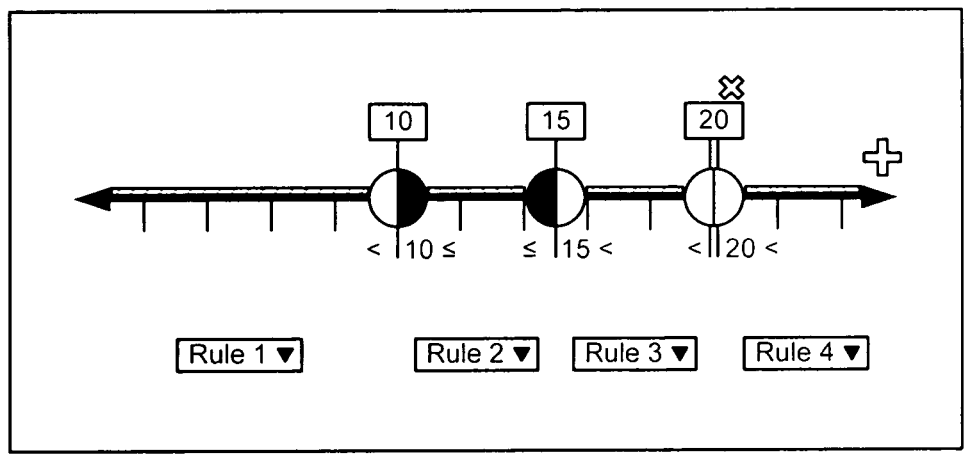

For purposes of clarity, FIG. 1B illustrates the interface 100 of FIG. 1A without reference numerals.

In a variety of embodiments, the interface 100 is quite flexible. Merely by way of example, the scale of the interface element (slider) 105 may be modified, perhaps by selecting and dragging on either end of the slider 105 itself, or through any other appropriate method. Alternatively and/or additionally, the overall range of values within the spectrum represented by the slider 105 can be modified, perhaps through similar means. Additional interface elements, such as an element 135 to add an additional marker and/or an element 140 to delete an existing marker, may be provided as well. (In some cases, when a marker is deleted, the interface is configured to adjust the adjacent ranges to account for the deleted markers. For example, if the marker 110b were deleted, the ranges 115b and 115c, which were defined by the marker 110b, would be left undefined. The interface 110 might be automatically configured to define a new range that would encompass prior ranges 115b and 115c; that is, a range that is defined by markers 110a and 10c. In another sense, this operation might be thought of as re-defining range 112b to include the values previously included in range 112c, or vice-versa.) In an aspect of some embodiments, the element 140 for deleting a marker is presented upon the user taking some action, such as hovering a mouse cursor over a marker and/or the corresponding text input box, right-clicking the same, and/or the like.

Figure 2:
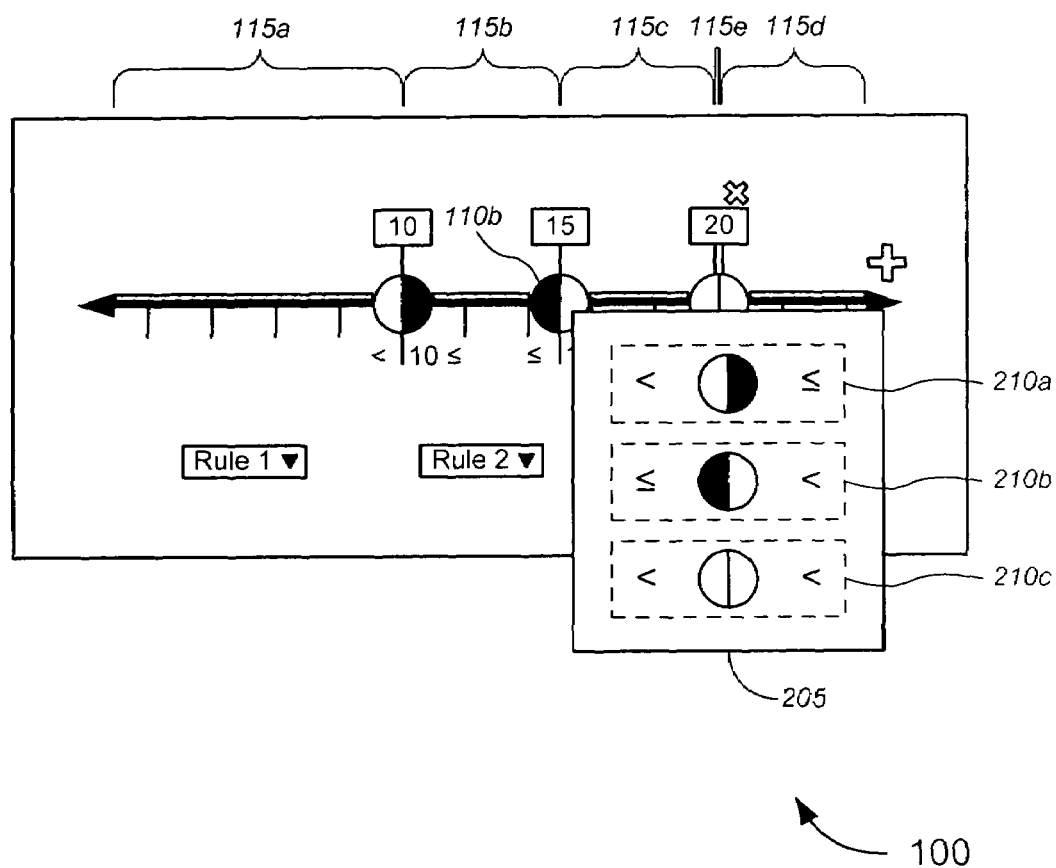

As noted above, in an aspect of some embodiments, the user is provided the opportunity to define the behavior of a particular marker 110. Merely by way of example, the user may be given the option to select a marker 110 (e.g., by hovering a mouse cursor over the marker 110, right-clicking on the marker 110, pressing a hotkey, etc.) to thereby invoke a behavior selection interface. An exemplary behavior selection interface 205 is illustrated by FIG. 2, which depicts the user interface 100 after the user has invoked the behavior selection interface 205 for marker 110b. Although a behavior selection interface can take many forms in accordance with various embodiments of the invention, the behavior selection interface 205 illustrated by FIG. 2 is configured to allow a user to choose one of three behavior options 210 for the marker 110b.

Specifically, the user can select a first behavior option 210a, in which the value represented by the marker 110b is part of the range 115c of values to the right of the marker 110b, a second behavior option 210b, in which the value represented by the marker 110b is part of the range 115b of values to the left of the marker 110b, or a third behavior option 210c, in which the marker 110b is part of neither range 115b nor range 115c (in which case, the marker 110b would become a range unto itself, as described in further detail above). In the illustrated embodiment, each behavior option 210 is represented by a depiction of the marker with the appropriate shading, according to the convention described above (although it is worth noting, again, that any appropriate convention may be used to indicate marker behavior—merely by way of example, as depicted by FIG. 2, the behavior interface 205 additionally and/or alternatively might include textual indica of marker behavior, such as appropriate < and/or ≤ symbols.

Figure 3:
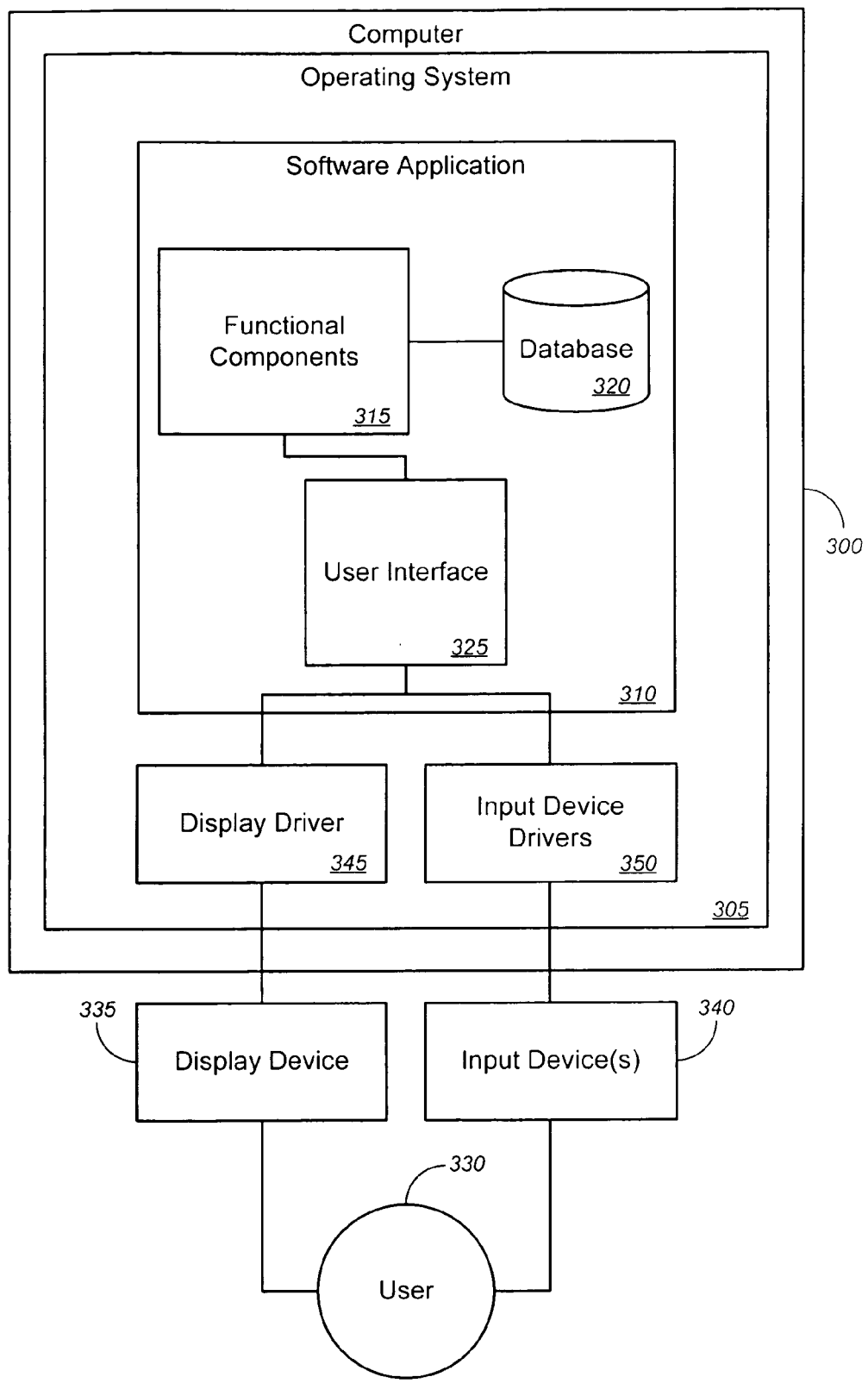
FIG. 3 is a generalized block diagram illustrating a relationship between a software application and a user, in accordance with various embodiments of the invention.

In many cases, a user interface for displaying and/or defining ranges (such as the interface 105 described above, to name but one example) may be part of (and/or employed by) a larger software application, which might be a browser-based application (e.g., an application implemented in Java, JavaScript and/or the like and designed to be used within a web browser), a business application (such as those described elsewhere herein, for example), a database application, and/or the like. FIG. 3 illustrates a generalized relationship between such an application and a user.

In accordance with the embodiments illustrated by FIG. 3, a computer system 300 is configured with an operating system 305, which executes a software application 310. The operating system 305 might be any of several well-known operating systems, including without limitation those described elsewhere herein. The software application can be any of a variety of applications, such as business applications, e-commerce applications, web application, desktop applications, and the like. In a particular aspect, the software application comprises a set of functional components 315 that provide the business logic and/or functional operation of the application 310. In some cases, the software application 310 comprises (and/or is in communication with) a database 330, which might be configured to store data created and/or used by the software application 310. Merely by way of example, if the software application 310 is a business application, the database 330 might be used to store data (such as sales data, customer data, inventory data, and/or the like) necessary to the business.

The software application 310 also comprises a user interface 325 that serves to provide communication between these functional components 315 and a user 325. The user interface 320 communicates with the user 325 through a variety of hardware interfaces, including without limitation a display device 335 and/or a set of input devices 340 (which might include one or more pointing devices, such as a mouse, trackball and/or the like, as well as, in many cases, a keyboard). More particularly, the user interface 325 generally will provide information to the user via the display 335 and receive information from the user via the input devices. Merely by way of example, the interface 325 might include the user interface 100 described in detail above, and in such a case would include instructions to display the interface elements (such as the slider 105, markers 110, etc.) on the display 335 and receive input (such as input to manipulate a marker 110a) via the input devices 340.

The operating system 305 generally will comprise a variety of device drivers to provide interaction between the operating system 305 (and/or the software application 310) and the hardware of the computer 300. In particular, the device drivers might comprise a display driver 345, which provides communication between the operating system 305 and/or software application 310 and the display 335 (usually via a video chipset and hardware interface, not pictured) and/or a set of input device drivers 350, which provide communication between the software 305, 310 and the input devices 340 (e.g., via a USB port, etc., not pictured).

Hence, in a set of embodiments, the user interface 325 (which again, might comprise the user interface 100 of FIG. 1) is configured to allow a user to provide a set of inputs (e.g., via the input devices 340) to define a first range of values. Such inputs might include one input (such as manipulation by a mouse, text input from a keyboard, etc.) to set a position of a first marker, which would represent the beginning of a range, as well as another input to set a position of a second marker, which would represent the end of the range. The interface 325, then, could provide, as input to the application, the range of values defined by the markers.

There are a variety of ways in which the software application 3 10 might invoke an interface such as the interface 100 described above. Merely by way of example, a business application might include a decision table (a tool known to those skilled in the art). The decision table might be configured to allow the user 330 to textually enter a range of values, but it might also include a prompt (such as a button, etc.) that would allow the user 330 to invoke the interface 100 to facilitate the range definition process. In other cases, the user 330 might not even be given the option to manually enter the range values into the decision table—for example, when a field requiring a range value is given focus (e.g., if the user 330 selects the field with a mouse, tabs into the field, etc.), the interface 100 might automatically be presented to the user. Based on this disclosure, one skilled in the art will appreciate the wide variety of ways in which the interface 110 could be invoked by the software application 3 10.

Figure 5:
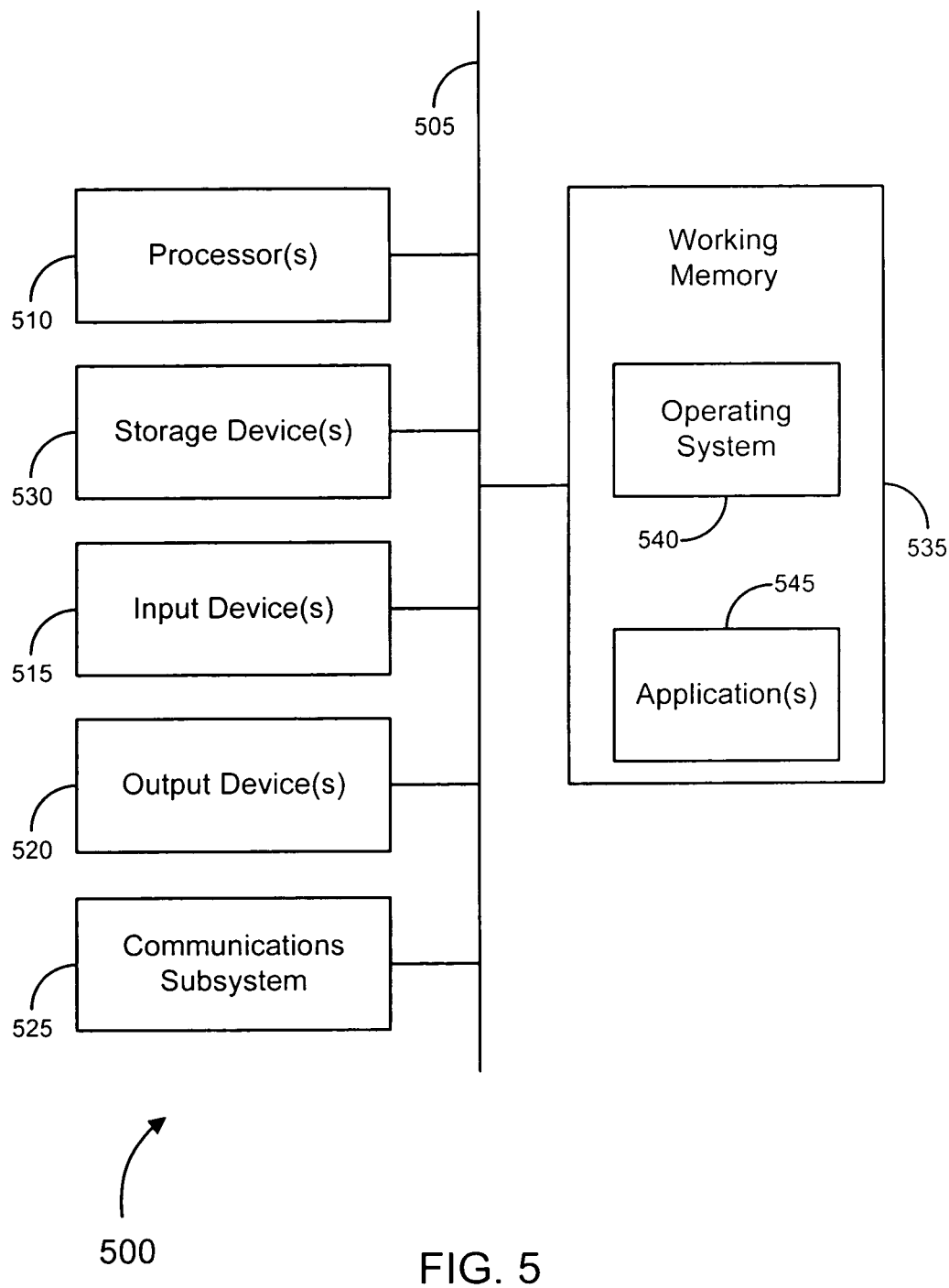
FIG. 5 is a generalized schematic diagram illustrating a computer system that can be used in accordance with various embodiments of the invention.

It should be noted that the software components of the computer 300, such as the operating system 305 and software application 310, and drivers 345 and 350 might be implemented as one or more sets of instructions stored on a computer-readable medium and executable by a processor within the computer 300. FIG. 5, described in further detail below, illustrates an exemplary hardware configuration of a computer such as the computer 300 of FIG. 3. It should also be noted, as described in further detail with respect to FIG. 6 below, that some or all of these software components and/or the database 325 might reside on and/or be executed by another computer, such as a server. Hence, FIG. 3 should be considered merely a generalized illustration of one set of embodiments (among many) that provide computer systems and/or applications.

Figure 4:
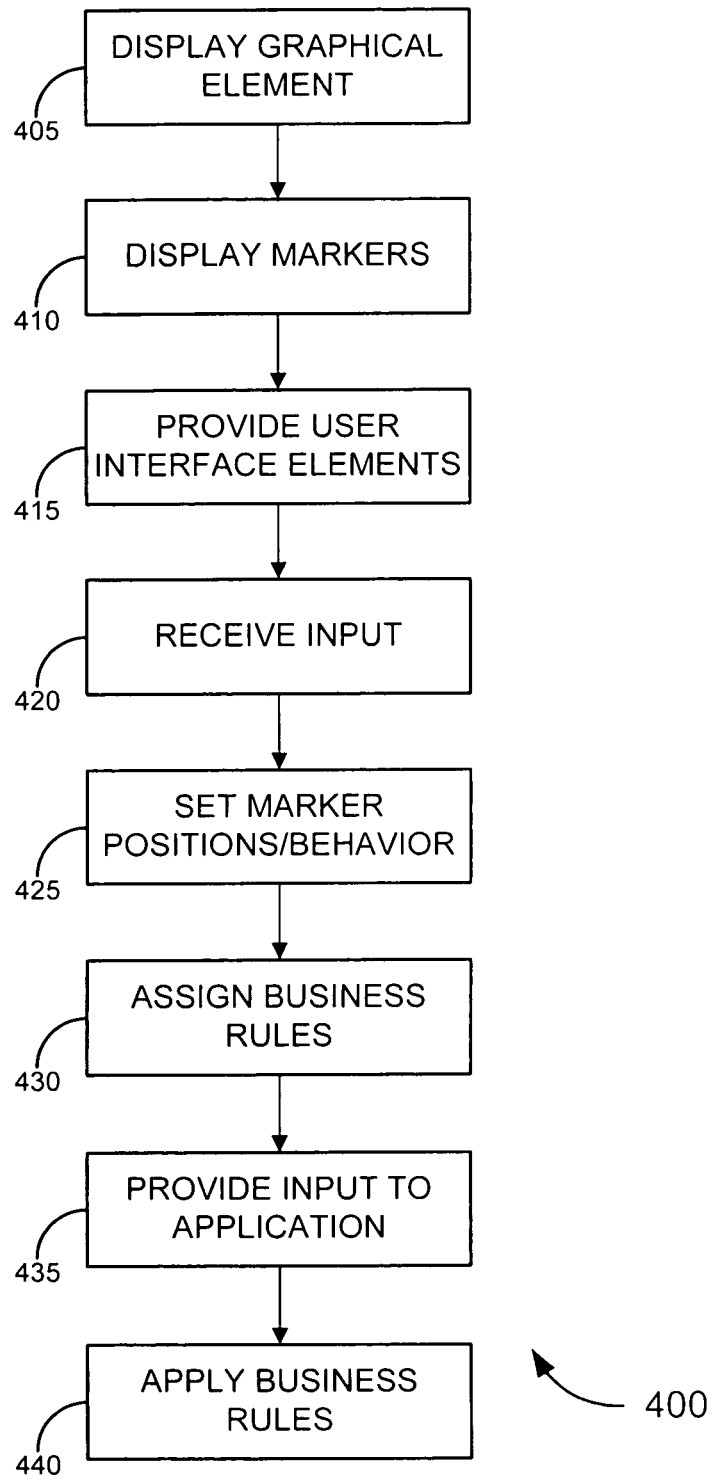
FIG. 4 is a process flow diagram illustrating a method of presenting information to a user and/or allowing a user to define ranges of values, in accordance with various embodiments of the invention.

FIG. 4 illustrates a method 400 that utilizes a user interface (such as the interface 100 described above) to display ranges of values to a user and/or to allow a user to define one or more ranges of values. In an embodiment, the method comprises displaying (e.g., on a display device, as part of a user interface) a graphical element that represents a spectrum of values (block 405).

In some embodiments, the method further comprises displaying one or more markers (block 410), each corresponding to a value along the spectrum. The interface 100 of FIG. 1 is an example of three markers 110 being displayed along with a graphical element 105, in accordance with one set of embodiments (although it should be appreciated that other embodiments might display such components in a different fashion).

At block 415, user interface elements are provided. A variety of user interface elements might be provided to receive user input, including without limitation the components of the interface 100 described above. Merely by way of example, the markers themselves, as described above, might be user elements capable of receiving user input. Additionally and/or alternatively, there might be user interface elements for changing the scale and/or inputs of the slider itself, text input elements to allow a user to textually define the position of a marker, interface elements to allow a user to set the behavior of a marker (e.g., which, if either adjacent range a marker—or, more properly, the value represented by the marker—should be a member of). In a particular aspect, there might be provided one or more user interface elements (as described above, for example) that allow a user to assign a business rule to a particular range or ranges.

Hence, at block 420, user input (such as input from a pointing device, keyboard and/or the like) is received. A variety of types of user input might be received, corresponding, in many cases, to the types of interface elements provided (as described above, for instance). Merely by way of example, as noted above, user inputs may be received for adding a new marker, deleting an existing marker, setting the position of a marker, changing the behavior of a marker, assigning a business rule to a range, and/or the like. Merely by way of example, a first input might set the position of a first marker, thereby setting a value representing the beginning of a first range, while a second input might set a position of a second marker, which sets a value representing the end of the first range. To continue the example, a third input might set the position of a third marker, and the values of the second marker and third marker might define a second range (i.e., represent the beginning and ending, respectively, of the second range).

Accordingly, at block 425, the positions and/or behavior of one or more markers. In some cases, the positions and/or behavior of the marker(s) are set based on, and/or responsive to, the received input; there are a variety of ways described herein by which the position of a marker can be set (e.g., by manipulation with a mouse cursor, by text input, and/or the like). In other cases, the positions of the markers may be set without receiving any input (for example, there might be default marker positions). In further cases, there may be provided no markers until a user provides input to add one or more markers to the interface. (It should be noted that at least one, and in many cases two, markers are required to define a range—a single marker can define a range that is coextensive with the value of the marker, and two markers can define a range of values between those of each marker. Hence, adding a marker can, in many cases, define a new range, and perhaps redefine another range. Merely by way of example, if two markers, with values of 0 and 10, define a range from 0-10, and a marker with a value of 12 is added, a new range, with values from >10 to 12, might be defined. Similarly, if a new marker with a value of 5 is added, a new range, with values of >5 to 10 might be defined, and the existing range might be redefined to include values of 0 to 5. Alternatively, this second operation could be thought of as defining two new ranges and deleting—or undefining—an existing range.)

As noted above, the interfaces provided by various embodiments may (but need not necessarily) be used to assign specific business rules to various ranges of values (e.g., as defined by the markers) (block 430). A wide variety of business rules (including without limitation the types of rules described above) may be assigned to ranges in accordance with embodiments of the invention. In some cases, an interface element might be used (as described above, for example) to assign rules to various ranges. The interface element might be configured to provide one or more pre-defined rules for selection by a user and/or to allow a user to define new rules. Those skilled in the art, based on the disclosure herein, will appreciate the wide variety of rules that can be defined and assigned to ranges in accordance with embodiments of the invention.

At block 435, the ranges of values defined by the markers, and/or, optionally, any associated business rules assigned to the ranges, are provided as input to a software application. The software application might be (but need not necessarily be) the application that presented the interface to the user. One skilled in the art will appreciate, based on the disclosure herein, that there are a variety of methods that allow a software application to receive input from a user interface. Merely by way of example, if the interface is constructed in an event-based environment (such as a Java environment and/or the like), an event might be associated with a particular interface element (such as a button), and the event might collect data from various other elements (such as markers, a slider, etc.) and encapsulate that data for input to an underlying application. Other procedures may be used as well.

At block 440, business rules assigned to one or more ranges of values might be applied to data falling within those ranges. Merely by way of example, if a range of 0 to 10 for values of a QUANTITY variable is assigned business rule A, and a range of >10 to 20 for values of that variable is assigned business rule B, the application might sort a set of records into those two ranges, and apply business rule A to all records with a QUANTITY value between greater than or equal to 0 and less than or equal to 10 . Similarly, the application might apply business rule B to all records with a QUANTITY value greater than 10 and less than or equal to 20 . As noted above, a wide variety of business rules can be supported, and the types of business rules applied generally will vary by implementation.

FIG. 5 provides a generalized schematic illustration of one embodiment of a computer system 500 that can perform the methods of the invention and/or the functions of computer, such as the computers described above. FIG. 5 is meant only to provide a generalized illustration of various components, any of which may be utilized as appropriate. The computer system 500 can include hardware components that can be coupled electrically via a bus 505, including one or more processors 510.

Merely by way of example, in communication with the bus 505 (perhaps via interface hardware, such as ports and the like) can be one or more input devices 515, which can include without limitation a mouse, a keyboard and/or the like; one or more output devices 520, which can include without limitation a display device, a printer and/or the like; and a communications subsystem 525; which can include without limitation a modem, a network card (wireless or wired), an infra-red communication device, and/or the like).

In addition, one or more storage devices 530 might be coupled to the bus. Such storage devices 530 can include without limitation a disk drive, an optical storage device, solid-state storage device such as a random access memory ("RAM") and/or a read-only memory ("ROM"), which can be programmable, flash-updateable and/or the like (and which can function as a data store). In some cases, storage devices might include one or more RAID systems, and the computer system 500 might include a RAID controller that is operable to configure and/or manage such RAID systems.

The computer system 500 also can comprise software elements, shown as being currently located within a working memory 535 (but which could also more permanently be stored on one or more of the storage devices 530 and/or other computer readable media). The software elements generally will include one or more sets of instructions that are executable by the computer system 500. Specifically, the software elements can including, without limitation, an operating system 540 and/or other code 545, such as an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

Figure 6:
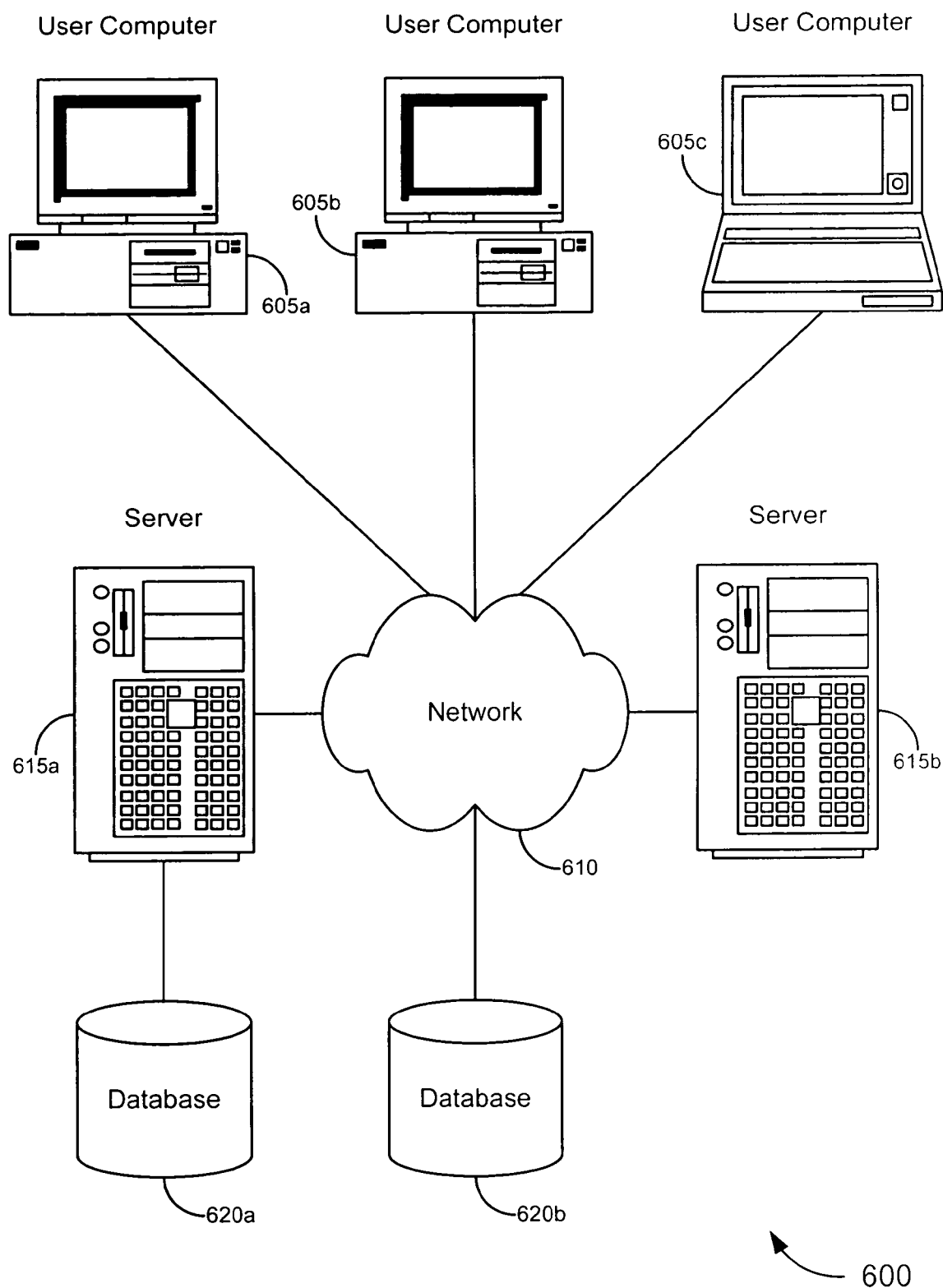
FIG. 6 is a block diagram of a networked computer system that can be used in accordance with various embodiments of the invention.

As noted above, a set of embodiments comprises networked systems, which can support web applications, client-server applications, and/or the like. Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant, capable of communicating via a network (e.g., the network 610 described below) and/or displaying and navigating web pages or other types of electronic documents. Although the exemplary system 600 is shown with three user computers, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system including without limitation any of those discussed above, as well as any commercially-available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention. Merely by way of example, in a set of embodiments, a business application comprising an interface (such as the interface 100 described above) might be provided as a web-based application from a web server.

The server computers 615, in some embodiments, might further include one ore more file and or/application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation business applications and/or web applications (which might, in some cases, be configured to perform methods of the invention). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on a user computer 605 and/or another server 615. In some embodiments, an application server can create web pages dynamically; such pages might include an interface such as the interface 100 described above for defining ranges of values. Data provided by an application server may be formatted as web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server.

In accordance with further embodiments, one or more servers 615 can function as a file server and/or can include one or more of the files necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. The SAN might be implemented as a disk group in accordance with embodiments of the invention. (Likewise, any necessary files for performing the functions attributed to the computers 605, 615 can be stored locally on the respective computer and/or remotely, as appropriate.) In one set of embodiments, the database 635 can be a relational database, such as an Oracle database, that is adapted to store, update, and retrieve data in response to SQL-formatted commands. The database might be controlled and/or maintained by a database server, as described above, for example. In particular embodiments, the database server might be configured with DBMS software.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of graphically presenting information to a user, the method comprising:
   displaying on a display device a graphical element representing a spectrum of values;
   displaying on a display device a first marker, wherein the first marker represents a beginning of a first range of values within the spectrum of values;
   displaying on a display device a second marker, wherein the second marker represents an end of the first range of values and a beginning of a second range of values within the spectrum of values;
   displaying on a display device a third marker, wherein the third marker represents an end of the second range of values within the spectrum of values;
   displaying on a display device a first interval representing the first range of values bounded by the first and second markers;
   displaying on a display device a second interval representing the second range of values bounded by the second and third markers;

graphically indicating within the first marker whether a first value represented by a position of the first marker is part of the first range of values or is outside of the first range of values;

graphically indicating within the second marker whether a second value represented by a position of the second marker is part of only the first range of values, part of only the second range of values, part of both ranges of values or excluded from both ranges of values;

graphically indicating within the third marker whether a third value represented by a position of the third marker is part of the second range of values or is outside of the second range of values;

receiving, from a user, a first input setting the position of the first marker, thereby setting the first value;

receiving, from a user, a second input setting the position of the second marker, thereby setting the second value;

receiving, from a user, a third input setting the position of the third marker, thereby setting the third value;

receiving, from a user, a fourth input specifying a behavior of the first marker, the behavior of the first marker defining whether the first value represented by the position of the first marker is part of the first range of values or is outside of the first range of values;

representing the fourth input graphically within the first marker;

receiving, from a user, a fifth input specifying a behavior of the second marker, the behavior of the second marker defining whether the second value represented by the position of the second marker is part of only the first range of values, part of only the second range of values, part of both ranges of values, or part of neither ranges of values;

representing the fifth input graphically within the second marker;

receiving, from a user, a sixth input specifying a behavior of the third marker, the behavior of the third marker defining whether the third value represented by the position of the third marker is part of the second range of values or is outside of the second range of values;

representing the sixth input graphically within the third marker;

providing, as input to a software application, the first range of values, as defined by the positions and behaviors of the first and second markers, and the second range of values, as defined by the positions and behaviors of the second and third markers.

2. A method as recited by claim 1, further comprising:
providing an interface element for the user to define a first business rule that applies to at least one of the first range of values or second range of values.

3. A method as recited by claim 1, wherein receiving the fifth input comprises:
displaying for the user a menu; and
receiving from the user a selection from the menu.

4. A method as recited by claim 1, further comprising:
adjusting a displayed position of at least one of the markers in response to receiving the at least one of the inputs.

5. A system comprising:
a processor; and
a memory coupled with and readable by the processor and storing therein a set of instructions which, when executed by the processor, causes the processor to graphically present information to a user by:
displaying on a display device a graphical element representing a spectrum of values;

displaying on a display device a first marker, wherein the first marker represents a beginning of a first range of values within the spectrum of values;

displaying on a display device a second marker, wherein the second marker represents an end of the first range of values and a beginning of a second range of values within the spectrum of values;

displaying on a display device a third marker, wherein the third marker represents an end of the second range of values within the spectrum of values;

displaying on a display device a first interval representing the first range of values bounded by the first and second markers;

displaying on a display device a second interval representing the second range of values bounded by the second and third markers;

graphically indicating within the first marker whether a first value represented by a position of the first marker is part of the first range of values or is outside of the first range of values;

graphically indicating within the second marker whether a second value represented by a position of the second marker is part of only the first range of values, part of only the second range of values, part of both ranges of values or excluded from both ranges of values;

graphically indicating within the third marker whether a third value represented by a position of the third marker is part of the second range of values or is outside of the second range of values;

receiving, from a user, a first input setting the position of the first marker, thereby setting the first value;

receiving, from a user, a second input setting the position of the second marker, thereby setting the second value;

receiving, from a user, a third input setting the position of the third marker, thereby setting the third value;

receiving, from a user, a fourth input specifying a behavior of the first marker, the behavior of the first marker defining whether the first value represented by the position of the first marker is part of the first range of values or is outside of the first range of values;

representing the fourth input graphically within the first marker;

receiving, from a user, a fifth input specifying a behavior of the second marker, the behavior of the second marker defining whether the second value represented by the position of the second marker is part of only the first range of values, part of only the second range of values, part of both ranges of values, or part of neither ranges of values;

representing the fifth input graphically within the second marker;

receiving, from a user, a sixth input specifying a behavior of the third marker, the behavior of the third marker defining whether the third value represented by the position of the third marker is part of the second range of values or is outside of the second range of values;

representing the sixth input graphically within the third marker;

providing, as input to a software application, the first range of values, as defined by the positions and behaviors of the first and second markers, and the second range of values, as defined by the positions and behaviors of the second and third markers.

6. A system as recited by claim 5, further comprising:
providing an interface element for the user to define a first business rule that applies to at least one of the first range of values or second range of values.

7. A system as recited by claim 5, wherein receiving the fifth input comprises:
displaying for the user a menu; and
receiving from the user a selection from the menu.

8. A system as recited by claim 5, further comprising:
adjusting a displayed position of at least one of the markers in response to receiving the at least one of the inputs.

9. A computer-readable memory device comprising a set of instructions stored therein which, when executed by a processor, causes the processor to graphically present information to a user by:
displaying on a display device a graphical element representing a spectrum of values;
displaying on a display device a first marker, wherein the first marker represents a beginning of a first range of values within the spectrum of values;
displaying on a display device a second marker, wherein the second marker represents an end of the first range of values and a beginning of a second range of values within the spectrum of values;
displaying on a display device a third marker, wherein the third marker represents an end of the second range of values within the spectrum of values;
displaying on a display device a first interval representing the first range of values bounded by the first and second markers;
displaying on a display device a second interval representing the second range of values bounded by the second and third markers;
graphically indicating within the first marker whether a first value represented by a position of the first marker is part of the first range of values or is outside of the first range of values;
graphically indicating within the second marker whether a second value represented by a position of the second marker is part of only the first range of values, part of only the second range of values, part of both ranges of values or excluded from both ranges of values;
graphically indicating within the third marker whether a third value represented by a position of the third marker is part of the second range of values or is outside of the second range of values;
receiving, from a user, a first input setting the position of the first marker, thereby setting the first value;
receiving, from a user, a second input setting the position of the second marker, thereby setting the second value;
receiving, from a user, a third input setting the position of the third marker, thereby setting the third value;
receiving, from a user, a fourth input specifying a behavior of the first marker, the behavior of the first marker defining whether the first value represented by the position of the first marker is part of the first range of values or is outside of the first range of values;
representing the fourth input graphically within the first marker;
receiving, from a user, a fifth input specifying a behavior of the second marker, the behavior of the second marker defining whether the second value represented by the position of the second marker is part of only the first range of values, part of only the second range of values, part of both ranges of values, or part of neither ranges of values;
representing the fifth input graphically within the second marker;
receiving, from a user, a sixth input specifying a behavior of the third marker, the behavior of the third marker defining whether the third value represented by the position of the third marker is part of the second range of values or is outside of the second range of values;
representing the sixth input graphically within the third marker;
providing, as input to a software application, the first range of values, as defined by the positions and behaviors of the first and second markers, and the second range of values, as defined by the positions and behaviors of the second and third markers.

10. A computer-readable memory device as recited by claim 9, further comprising:
providing an interface element for the user to define a first business rule that applies to at least one of the first range of values or second range of values.

11. A computer-readable memory device as recited by claim 9, wherein receiving the fifth input comprises:
displaying for the user a menu; and
receiving from the user a selection from the menu.

12. A computer-readable memory device as recited by claim 9, further comprising:
adjusting a displayed position of at least one of the markers in response to receiving the at least one of the inputs.

\* \* \* \* \*

UNITED STATES PATENT AND TRADEMARK OFFICE
CERTIFICATE OF CORRECTION

PATENT NO.         : 8,627,232 B2  
APPLICATION NO.    : 11/603778  
DATED              : January 7, 2014  
INVENTOR(S)        : Stiso et al.

Page 1 of 1

It is certified that error appears in the above-identified patent and that said Letters Patent is hereby corrected as shown below:

In the Specification

In column 1, line 35, after "having" insert -- a --.

In column 3, line 29, delete "First" and insert -- first --, therefor.

In column 3, line 57, delete "values. Such" and insert -- values, such --, therefor.

In column 6, line 17, delete "point" and insert -- point, --, therefor.

In column 7, line 61, delete "indica" and insert -- indicia --, therefor.

In column 9, line 1, delete "110. Such" and insert -- 110, such --, therefor.

In column 9, line 9, delete "(Such" and insert -- (such --, therefor.

In column 9, line 45, delete "10c." and insert -- 110c. --, therefor.

In column 10, line 17, delete "indica" and insert -- indicia --, therefor.

In column 10, line 62, delete "335" and insert -- 335, --, therefor.

In column 11, line 22, delete "3 10" and insert -- 310 --, therefor.

In column 11, line 37, delete "3 10." and insert -- 310. --, therefor.

In column 13, line 30, delete "10 ." and insert -- 10. --, therefor.

In column 13, line 32, delete "20 ." and insert -- 20. --, therefor.

In column 13, line 47, delete "5 15," and insert -- 515, --, therefor.

In column 15, line 12, delete "ore" and insert -- or --, therefor.

In column 15, line 12, delete "and or/application" and insert -- and/or application --, therefor.

Signed and Sealed this  
Eighth Day of July, 2014

Michelle K. Lee  
*Deputy Director of the United States Patent and Trademark Office*